June 17, 1969  R. S. JOHN, JR  3,450,018
AUTOMATIC FOCUSING APPARATUS
Filed Aug. 30, 1966  Sheet 1 of 4

Inventor
Robert S. John, Jr.
By Griffin & Branigan
Attys

Inventor:
Robert S. John, Jr.
By Griffin & Branigan
Attys

Inventor:
Robert S. John, Jr.
By Griffin & Branigan
Attys

Inventor:
Robert S. John, Jr.

By Griffin & Branigan Attys

United States Patent Office 3,450,018
Patented June 17, 1969

3,450,018
AUTOMATIC FOCUSING APPARATUS
Robert S. John, Jr., Deerfield, Ill., assignor to Bell & Howell Company, Chicago, Ill., a corporation of Illinois
Filed Aug. 30, 1966, Ser. No. 576,081
Int. Cl. G03b 3/10
U.S. Cl. 95—45
17 Claims

ABSTRACT OF THE DISCLOSURE

An automatic range determining apparatus for adjusting the focus of an objective of an optical instrument such as a camera. Initially, an imaging lens is moved to an initial position. The imaging lens receives light from a scene and focuses the image of the scene onto the surface of a moving lenticular screen. When the lens focuses the scene image on the face of the screen, intensity variations due to the screen are reduced to a minimum so that the screen is invisible to a photocell and a null signal is generated in the circuit in which the photocell is connected. However, when the lens is not focused on the screen, the screen causes the photocell to see striations. A unidirectional servo motor connected to the photocell and to the imaging lens moves the lens to focus the scene until a null signal indicates that the lens is focused on the lenticular screen.

---

This invention relates to optical focusing and more particularly to automatic means for focusing a lens system.

In the art of photography, it is essential to have the object being viewed accurately focused upon a light sensitive surface for a perfect reproduction. This has been previously done by a manual adjustment of the distance between the lens and the light sensitive surface as the distance between the object and the lens varies. This requirement for manual adjustment of the lens to obtain and maintain focus as the object distance is varied has greatly restricted the use of photographic apparatus. For example, in the past, cameras have been limited because they not only require a focus adjustment prior to taking a picture, but if the object distance varied between the time the adjustment was made and the time the picture was snapped, an out-of-focus picture resulted. The prior art has recognized this problem and attempted to solve it by various optical, mechanical, and electrical devices. Examples of these devices are set forth in U.S. Patents 2,618,209, 2,339,780 and 2,838,600. However, these prior art devices have not proven entirely satisfactory. They are generally complex, requiring numerous electro-mechanical and optical components, many of which are specialized. These requirements of complex systems and special components have made the systems expensive and, therefore, unsuitable for widespread use in simple photographic apparatus.

The general purpose of this invention is to provide an automatic focusing system which overcomes the disadvantages of the prior art. A principal application of the invention is to cameras and the invention is described in a camera environment. However, it can be used for obtaining the optical focus of other apparatus such as telescopes and microscopes.

An object of the invention is the provision of a new and improved apparatus for optical focusing.

Another object is to provide an apparatus for automatically focusing a camera.

Still another object of the invention is the provision of a rugged automatic optical focusing apparatus which utilizes a novel combination of standard electronic, mechanical and optical components.

A further object of the invention is the provision of a new and improved apparatus for setting optical focus which is simple in construction and operation and adapted for use in a simple camera.

When used in a camera, the foregoing and other objects of the instant invention are obtained by mounting a photocell along the optical projection axis of an imaging lens which is coupled to the main camera lens. A lenticular screen mounted between the imaging lens and the photocell is adapted to move its lenslets in a plane perpendicular to the image projection axis of the imaging lens. When the focal point of the imaging lens is not located on the face of a lenticular screen, the movement of the lenticular screen causes the photocell to see a moving series of lines or striations and the output of the photocell varies. However, when the focal point of the imaging lens is located on the face of the lenticular screen, the photocell sees a steady image and its output is relatively constant.

A suitable control means is operative in response to a variable output from the photocell to cause the imaging lens to move until its focal point is on the face of the lenticular screen. In this manner, the image of an object is focused on the lenticular screen. The main camera lens is focused by coupling it to the imaging lens so that when the imaging lens is focused on the lenticular screen, the main lens is focused on the camera's film. Hence, the invention provides a simple apparatus for automatically focusing a lens system. Moreover, because a telescope, microscope or other optical viewing system can be similarly automatically focused, it will be appreciated that the invention is applicable not only to cameras, but to optical systems in general.

Other objects and many of the attendant advantages of the invention will become apparent by consideration of the following detailed description and the accompanying drawings wherein.

Figure 1:
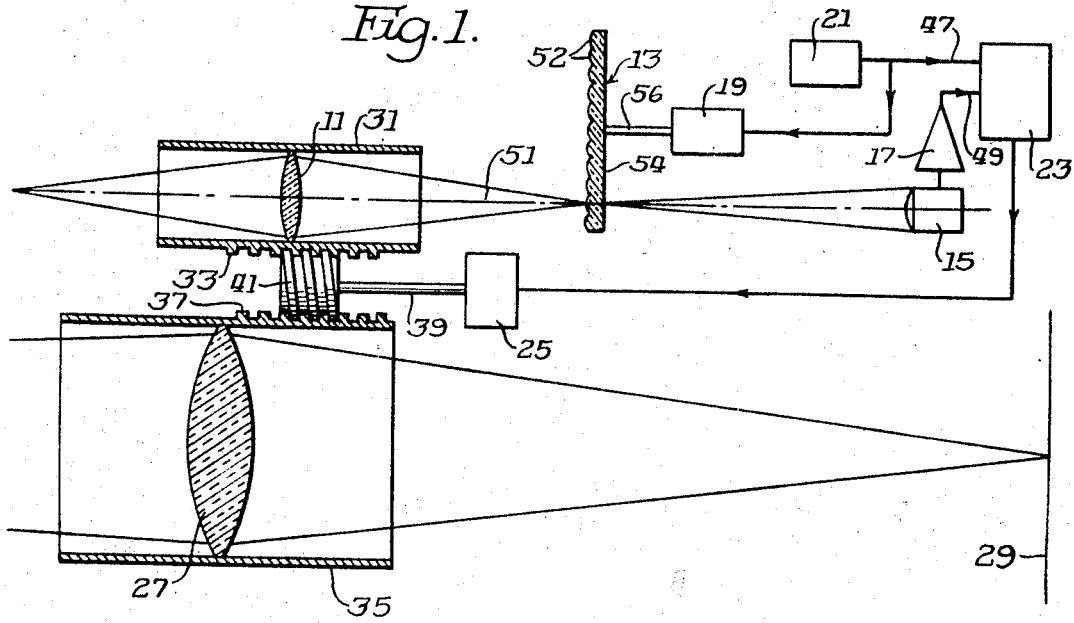
FIG. 1 is a partially pictorial and partially schematic diagram of one embodiment of the invention.

Turning now to a description of the drawings, wherein like reference numerals indicate like parts throughout the several views, FIG. 1 illustrates a preferred form of the invention as it is embodied in a camera. This embodiment includes an imaging lens section, a control section, and a main lens section. The imaging lens section comprises an imaging lens 11, a lenticular screen 13, and a photocell or other light detecting device 15, The control section comprises an amplifier 17, a synchronous motor 19, a signal source 21, a synchronous demodulator 23, and a bidirectional servomotor 25. The main lens section comprises a main lens 27 which it is desired to have focused on a photographic film 29.

While not illustrated in the drawings, it is to be understood that the imaging and main lens sections are mounted in a suitable light tight enclosure to prevent extraneous light from affecting the operation of the invention.

The imaging lens 11 is mounted in a barrel 31 having a rack 33 fixedly attached thereto. Similarly, the main camera lens 27 is mounted in a barrel 35 to which a rack 37 is affixed. The bidirectional servomotor 25 has a shaft 39 affixed to a worm gear 41 which engages both the imaging lens rack 33 and the main lens rack 37.

The signal source 21 generates a time varying output signal which is delivered to the synchronous motor 19 or other electromechanical transducer means as well as to one input 47 of the synchronous demodulator 23. The output from the photocell 15 is connected, through the amplifier 17, to the second input 49 of the synchronous demodulator 23. The output from the synchronous demodulator is connected to the bidirectional servomotor 25. Such a synchronous demodulator compares the signal from the signal source which powers the synchronous motor and the output signal from the photocell to determine both the amplitude and phase relationship of these signals. For maximum response, signal frequencies must be equal.

The imaging lens 11 has a projection axis 51 which intersects the lenticular screen 13 as shown. The photocell 15 is mounted on the opposite side of the lenticular screen 13 from the imaging lens and is also intersected by the projection axis 51 of the imaging lens 11. The synchronous motor 19 is connected to the lenticular screen 13 through a shaft 56 which is axially offset from the projection axis.

Figure 2:
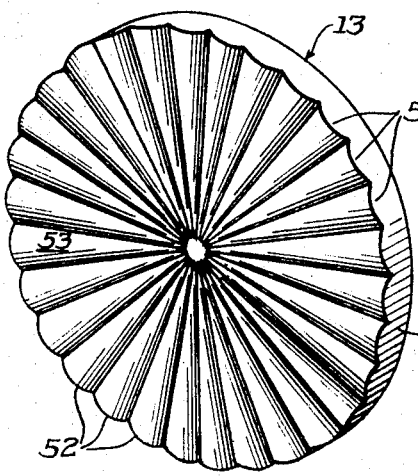
FIG. 2 is a pictorial diagram of a lenticular screen suitable for use in the embodiment of the invention illustrated in FIG. 1.
Figure 3:
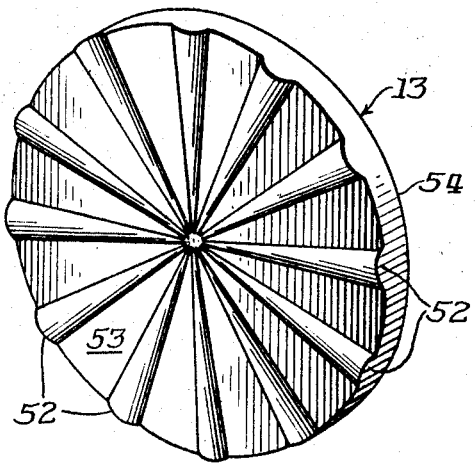
FIG. 3 is a pictorial diagram of another lenticular screen which can be used in the embodiment of the invention illustrated in FIG. 1.

Lenticular screens suitable for use in the embodiment of the invention illustrated in FIG. 1 are shown in FIGS. 2 and 3. These lenticular screens are constructed of a flat transparent material, such as plastic, and have a plurality of radially tapering semi-cylindrical lenslets 52 on one face 53 thereof, the other face 54 being flat. Broadly speaking, it is these lenslets that cause the photocell 15 to see a series of lines or striations moving across its photosensitive surface when the imaging lens does not have its focal point located on the lenticulated face 53 as the screen is revolved by the synchronous motor 19. As will be subsequently described in more detail, an electronic manipulation of the output from the photocell causes an appropriate movement of the imaging lens 11 to bring its focal point onto the face of the lenticular screen, at which point the system is in focus. Specifically, the signal source 21 generates a time varying output signal which causes the shaft 56 of the synchronous motor 19 to revolve in synchronism therewith. The lenticular screen 13, connected to the shaft 56, also revolves in accordance with the frequency of the signal from source 21.

As the lenslets of the lenticular screen pass through the projection axis of the imaging lens 11, the photocell may see a variable pattern of light. Specifically, the photocell sees a series of lines passing across its photosensitive surface if the imaging lens is not focused on the face of a lenticular screen. Moreover, the variation in illumination of the lines is dependent upon the distance of the imaging lens focal point from the lenticular screen. That is, the further the focal point is from the screen, the more pronounced is the variation of light. Hence, the movement of the lines across the surface of a photocell causes it to produce an oscillating output at the frequency of the screen's rotation and having a magnitude that is proportional to the distance of the imaging lens focal point from the screen.

The amplifier 17 is designed to operate at the synchronizing frequency and amplifies the oscillating output signals from the photocell. The output from the amplifier is applied to the second input 49 of the synchronous demodulator 23. The output of the synchronous demodulator is proportional to the difference between the magnitude of its two inputs. That is, the output of the demodulator is proportional to the difference in magnitude between the signals from the source 21 and the signals from the amplifier 17. In addition, the polarity of the modulator output is dependent upon the phase relationship of its inputs. More specifically, if the input from the signal source 21 leads the input from the amplifier 17, the demodulator output will have one polarity. If the input from the signal source 21 lags the input from the amplifier 17, the demodulator output polarity will be opposite. Whether the photocell output leads or lags the signal from the signal source 21 depends upon whether the focal point of the imaging lens 11 is to the left of, or to the right of, the lenticular screen 13 as seen in FIG. 1. For example, if a photographed object moves so as to cause the focal point of the imaging lens 11 to move to the left in FIG. 1, the photocell's output signal might lead the signal from source 21. If such is the case, the photocell output would lag the signal from source 21 if the photographed object moves so as to cause the focal point of the imaging lens 11 to move to the right of the lenticular screen.

When the synchronous demodulator 23 generates an output, it causes the shaft 39 of the bidirectional servomotor 25 to revolve in a direction which is dependent upon the polarity of the demodulator output. As the servomotor shaft 39 is thereby rotated one way or the other, the worm gear 41 causes the racks 33 and 37 to move in a rectilinear manner so as to bring both the focal point of the imaging lens 11 into the plane of lenticular screen 13 and the focal point of the main lens 27 into the plane of film 29.

As soon as the focal point of the imaging lens 11 is in the plane of the lenticular screen, the lines cease to appear on the photocell. Hence, the magnitude of the modulated output of the photocell is insufficient to provide an effective input signal to the demodulator 23 and represents a "null" position.

As an example of the operation of the above described device, assume that it is desired to take a picture of a child. The device may be designed to be capable of automatic focusing at the operator's discretion, such as by pushing a button to energize the device. This type of operation is desirable if the operator wants to preset the focus by aiming it at the child and turning off the device to hold that focus. However, it may be equally as desirable to have a full time automatic focusing device, such as for moving objects. In such a device, the lens system automatically adjusts itself to place the child in precise focus and to maintain that focus even though the child moves. For example, when the child moves, the focal point of the imaging lens 11 moves from the face of lenticular screen 13 and causes the photocell 15 to see a series of striations. These striations cause the photocell output to be modulated and the demodulator to cause the bidirectional servomotor shaft 39 to rotate in a direction so as to bring the focal point of the imaging lens 11 back to the face of the lenticular screen 13. This movement also causes the main lens 27 to be focused on the film 29. Hence, this embodiment is an apparatus for automatically maintaining an object in focus. Moreover, it will be appreciated by those skilled in the art that the foregoing structure is a ruggedly simple device that both avoids the complexities of the prior art and is suitable for use in a relatively low cost consumer-type product.

It will also be appreciated by those skilled in the art, however, that proper operation of the above described structure is dependent upon certain optical design parameters which must be met. Specifically, the angle subtended by the diameter of the imaging lens as seen from the face of a lenticular screen must be greater than the sum of: (1) the ray acceptance angle of each lenslet; that is, the angle subtended by each lenslet as seen from its focal point, (2) the angle subtended by the photocell's active element as seen from the lenticular screen, and (3) the angle subtended by the object as seen from the forward focal point of the imaging lens. If the foregoing conditions are not met, the photocell 15 may see striations even though the object is in focus whereby the system would be caused to hunt. It is desirable to be able to have the imaging lens pick out only the field of interest. Accordingly, the field of view should be fairly small, preferably in the range of 1° to 2°.

Figure 11:
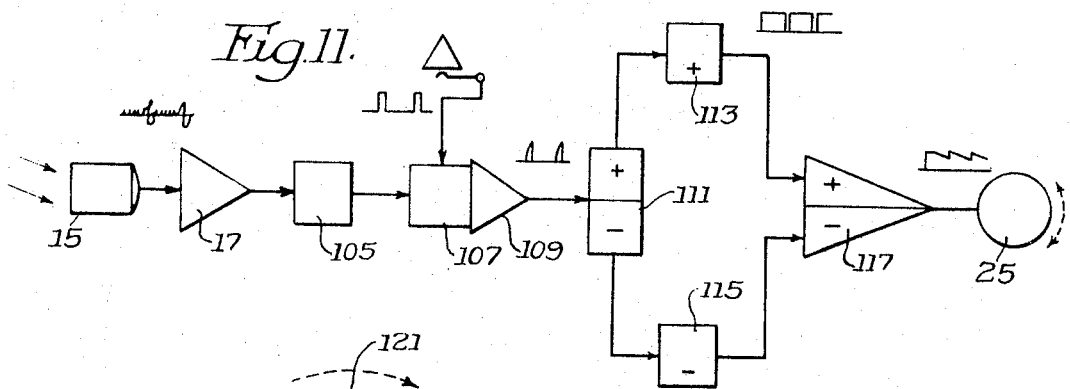
FIG. 11 is a schematic diagram of an alternative embodiment of an electronic control network suitable for use in the invention.

FIG. 11 illustrates an alternative control section for the embodiment of the invention illustrated in FIG. 1. The electronic network illustrated in FIG. 11 comprises a photocell 15, an amplifier 17, a filter 105, a gating circuit 107, a gate amplifier 109, a steering circuit 111, a positive trigger monostable multivibrator 113, a negative trigger monostable multivibrator 115, a complementary power amplifier 117, and a bidirectional motor 25.

Figure 12:
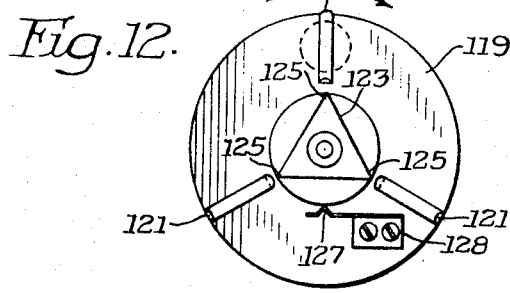
FIG. 12 is a pictorial diagram of a lenticular screen suitable for use with the system illustrated in FIG. 11.

The electronic control system illustrated in FIG. 11 operates in connection with a lenticular screen of the type illustrated in FIG. 12. The lenticular screen illustrated in FIG. 12 comprises a flat, circular, transparent material 119 having three lenslets 121 located 120° apart on one flat face. These lenslets are preferably semi-cylindrical. The lenslets illustrated in FIG. 12 do not extend all the way from the periphery of the circular face to the center of the lenticular screen but only extend a distance from the periphery. This distance is sufficient for a lenslet to pass completely through the projection axis 51 of the imaging lens 11. Mounted to revolve with the lenticular screen 119 is a commutator 123 having three lobes 125. Each lobe 125 is adapted to close a contact brush 127 each time a lenslet 121 passes through the projection axis 51. That is, the location of the contact brush is fixed so that it is closed by a lobe each time a lenslet passes through the projection axis of the imaging lens.

The contact brush 127 is connected to a micro switch 128. The micro switch is connected to the gate 107 of the circuit illustrated in FIG. 11. The photocell 15 is connected to the amplifier 17. The output from the amplifier 17 is connected to the filter 105. The output from the filter 105 is connected to the gating circuit 107. Each time a commutator lobe 125 operates the contact brush 127, the micro switch 128 "opens" the gate circuit 107. The gate circuit passes any signal received by the photocell 15 and passes by the filter 105. Because the gating circuit only allows a signal to pass when a lenslet is passing through the projection axis 51, it tends to eliminate any noise or false signals that occur when a lenslet is not passing through the projection axis.

The output from the gating circuit is connected to the gate amplifier 109. The ouput from the gate amplifier is connected to the steering circuit 111. The steering circuit operates to pass the output signal to either the positive trigger monostable multivibrator 113 or the negative trigger monostable multivibrator 114 depending upon its polarity. That is, as indicated above, when a lenticulation passes through the projection axis, the photocell output signal passed by the foregoing series circuit initially goes either positive or negative. Its initial direction determines whether the focal point of the imaging lens is in front of or in back of the lenticular screen. If it is a positive signal, it passes through the steering circuit and is applied to the positive monostable multvibrator 113. If it is a negative signal it passes through the steering circuit and is applied to the negative trigger monostable multibrator 115. Preferably, the gate circuit 107 is only gated long enough to detect the polarity of the signal and its magnitude.

The outputs from the positive and negative trigger monostable multivibrators are applied to the inputs of the complementary power amplifier 117. The complementary power amplifier is adapted to amplify both positive and negative signals and to provide a positive or negative output depending upon whether its positive or negative input is energized. The output signal from the complementary power amplifier is applied to the bidirectional motor 25. Hence, in a conventional manner, this motor will turn in a direction dependent upon a polarity of the signal applied to it. It operates as described above to move the imaging lens and the main lens to bring the focal point of the imaging lens onto the lenticular screen 119. At this point, the main lens will be focused on the film 29.

The frequency of revolution of the lenticular lens is determined by the output of the frequency source 21 illustrated in FIG. 1. The frequency source 21 provides a signal only to the synchronous motor 19 when a control system of the type illustrated in FIG. 11 is used, and does not provide a signal to the electronic control system.

Figure 4:
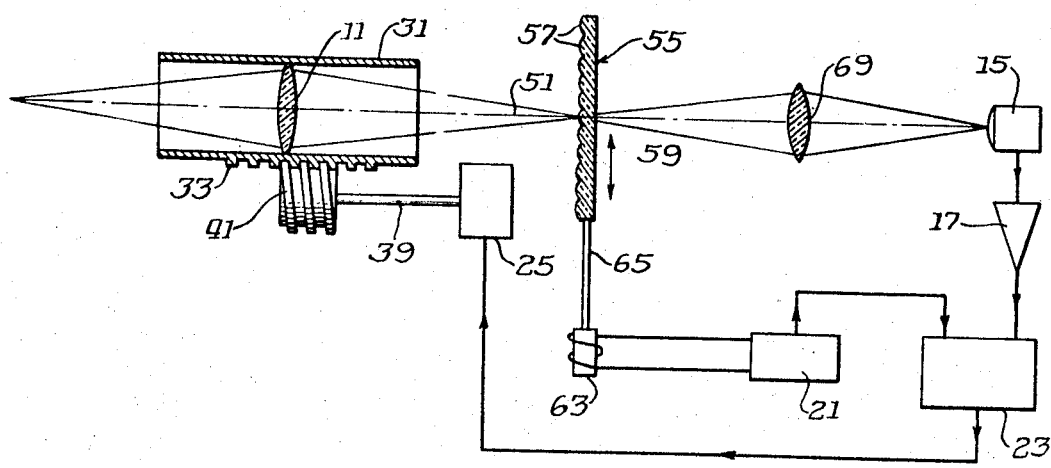
FIG. 4 is a partially pictorial and partially schematic diagram of another embodiment of the invention.
Figure 5:
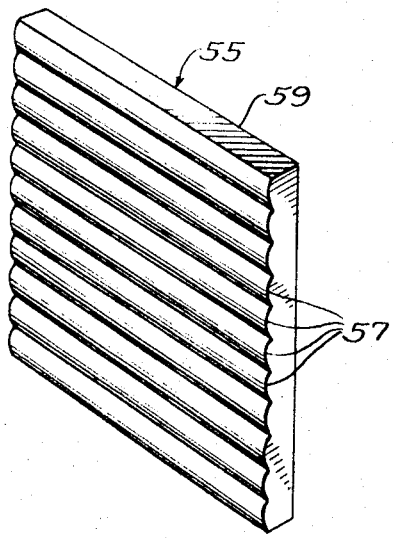
FIG. 5 is a pictorial diagram of a lenticular screen which can be utilized in the embodiment of the invention illustrated in FIG. 4.
Figure 6:
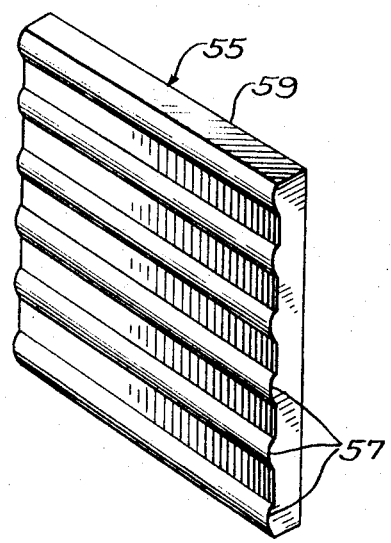
FIG. 6 is a pictorial diagram of yet another lenticular screen which can be utilized in the embodiment of the invention illustrated in FIG. 4.

FIG. 4 illustrates an alternative embodiment of the invention which uses a lenticular screen of the type illustrated in FIGS. 5 and 6. Specifically, this type of lenticular screen comprises a plurality of parallel semi-cylindrical lenslets 57 on one face of a flat transparent material with the opposing face 59 being flat. This embodiment of the invention is in all respects similar to the embodiment of the invention described in connection with FIG. 1 except that the lenticular screen 55 is vibrated perpendicularly in FIG. 4 on the armature 65 of a solenoid 63. In this embodiment, the signal source 21 causes the solenoid and thereby the lenticular screen to vibrate at the frequency of its signals and, as in the prior embodiment, the signal source 21 also provides a signal to one input of the synchronous demodulator 23.

Except for the operation of lenticular lens, the operation of the embodiment illustrated in FIG. 4 is substantially the same as that described in connection with FIG. 1 and therefore will not be further discussed. Similarly, although not shown, the FIG. 4 embodiment is adapted to be coupled to the camera main lens in the same manner as described above. Hence, for purposes of simplicity, this type of coaction will not be reiterated.

FIG. 4 also illustrates an additional component which enhances the operation of the invention but is not critical thereto. Specifically, FIG. 4 includes a schematically illustrated second lens 69 located between the lenticular screen 55 and the photocell 15. This second lens 69 functions, when suitably located along the axis 51, to magnify small lenticular lens striations in order that they may be better detected by the photocell 15.

It will be appreciated that a control system of the type illustrated in FIG. 11 can also be used in the FIG. 4 embodiment. All that is necessary to substitute the FIG. 11 control system into the FIG. 4 embodiment is to have a cam operate in conjunction with the passing of a lenslet through the projection axis to operate the contact brush 127.

Figure 7:
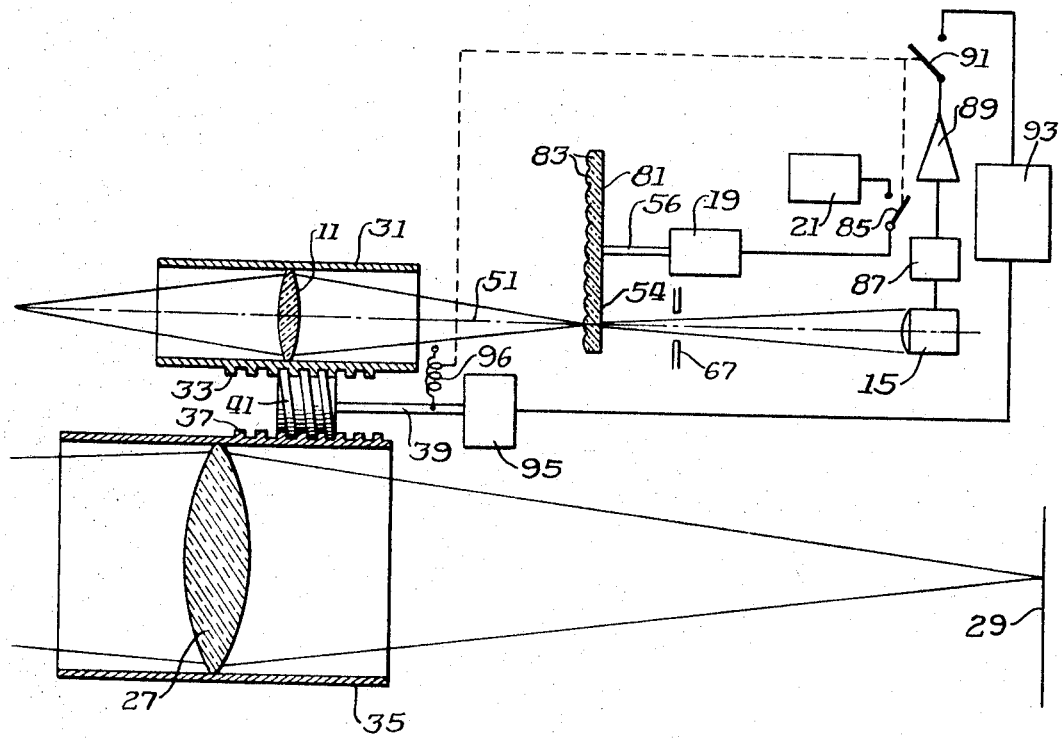
FIG. 7 is a partially pictorial and partially schematic diagram of still another embodiment of the invention.

FIG. 7 illustrates another embodiment of the invention which uses a lenticular screen system only to initially focus a camera but not to maintain focus. The system illustrated in FIG. 7 is somewhat similar to the system illustrated in FIG. 1 and includes an imaging lens 11 mounted in a barrel 31 and a main lens 27 mounted in a barrel 35. The imaging lens barrel 31 has a rack 33 fixedly attached thereto. Similarly, the main lens barrel 35 has a rack 37 attached thereto. Connected between the racks 33 and 37 is a worm gear 41 which upon revolution is adapted to move the barrels in synchronism along the respective projection axes of the imaging and main lenses.

Mounted along the projection axis of the imaging lens 11 is a lenticular screen 81. On the side of the lenticular screen facing the imaging lens 11 are a plurality of lenslets 83. A motor 19 having a shaft 56 is coupled to the lenticular screen 81 and is adapted to revolve it through the projection axis 51 in a manner similar to the operation of FIG. 1. The shaft 56 is offset from the projection axis 51. Connected to the motor 19 through a switch 85 is the power source 21. The power source drives the lenticular screen 81 through a shaft 56 coupled to the lenticular screen.

Mounted along the projection axis 51 on the opposite side of the lenticular screen is a photocell 15. The output from the photocell 15 is connected to an electronic filter 87. The output from the electronic filter is connected to the input of an integrating amplifier 89. The output from the integrating amplifier 89 is connected through a switch 91 to the input of a power amplifier 93. The output from the power amplifier 93 is connected to the input of a unidirectional motor 95. The shaft 39 of the unidirectional motor is connected to the worm gear 41 in a driving relationship. In addition, the shaft 39 is connected to a reset mechanism illustrated in FIG. 7 as a spring 96. The reset mechanism is adapted to reset the shaft of the motor to an initial position when it is activated as hereinafter described.

FIG. 7 also illustrates an additional component which enhances the operation of the invention but is not critical thereto. Specifically, FIG. 7 includes a mask 67 located between the photocell 15 and the lenticular screen 55, which serves to prevent light from outside the desired image region from reaching the photocell 15.

Figure 8:
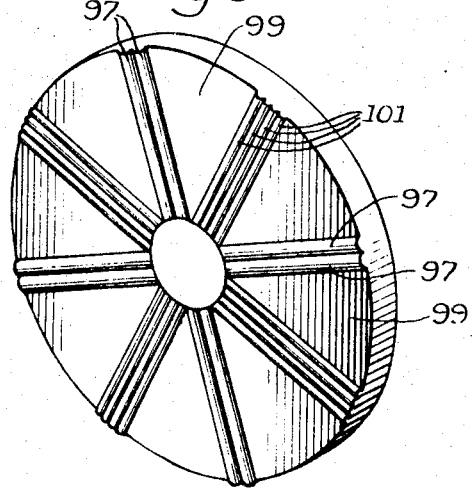
FIG. 8 is a pictorial diagram of a lenticular screen which can be used in the embodiment of the invention illustrated in FIG. 7.
Figure 9:
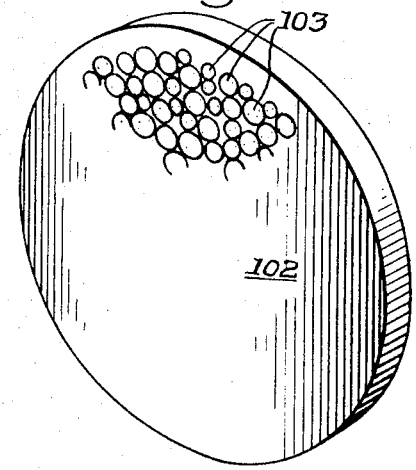
FIG. 9 is a pictorial diagram of another lenticular screen which can be utilized in the embodiment of the invention illustrated in FIG. 7.

The lenticular screen 81 illustrated in FIG. 7 may be of the type illustrated in FIGS. 8 and 9. The lenticular screen illustrated in FIG. 8 is a round flat piece of transparent material similar to the materials of the lenticular screens illustrated in FIGS. 1, 2, 5 and 6. The side of the lenticular screen having the lenslets in the configuration illustrated in FIG. 8 comprises a group of wide and narrow lenslets separated by flat spaces. Each group comprises a number of semi-cylindrical members. Specifically, a pair of parallel, wide lenslets 97 extend from generally the center of the circle to its periphery. Moving in an arc around the lenticular surface, the next area 99 is flat; thereafter, a series of parallel, narrow lenslets 101 occur. These narrow lenslets are illustrated as four in number. Following the parallel, narrow lenslets is another flat surface 99 followed by a second pair of parallel, wide lenslets 97. This alternate wide and narrow series of lenslets separated by flat spaces 99 extends around the lenticular screen in a radial manner. The lenslets illustrated in FIG. 8 are not radially tapering in the manner illustrated in FIGS. 1 and 2, although they could be.

The lenticular screen illustrated in FIG. 9 is also a flat round transparent material having a lenticulated face 102. The lenticulated face 102 of lenticular screen illustrated in FIG. 9 has a plurality of spherical lenslets 103 in random placement.

It is to be understood that the embodiment of the invention illustrated in FIG. 7 can operate with a control system of the type illustrated in FIG. 11 with a lenticular screen of the type illustrated in FIG. 12. However, only one side of the loop between the steering circuit 111 and the complementary power amplifier 117 is necessary because in the FIG. 7 embodiment, the motor operates unidirectionally and not bidirectionally.

Figure 10A:
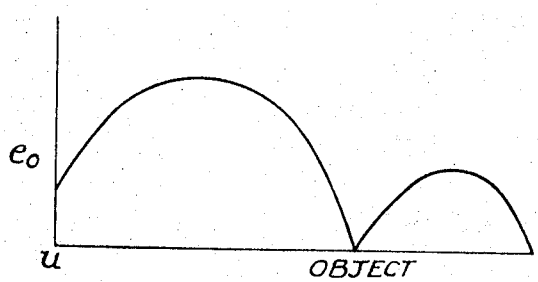
FIGS. 10A–10C are graphs illustrating the voltage output change from a photocell for different lenslet sizes and configurations.

It has been found that when similarly formed lenslets, of the type illustrated in FIGS. 2, 3, 5 and 6, are used in the invention the lenslet focal length must be within a particular range. That is, for the invention to operate with these types of lenticular screens, the focal length of the lenslets ($f_s$) must be less than or equal to $f^2/u$, where $u$ is the minimum allowed distance from the imaging lens to an object and $f$ is the focal length of the imaging lens. A lenslet of this type ($f^2/u$) provides a photocell output signal variation of the type illustrated in FIG. 10A. The output signal is nulled when the object's image plane is coincident with the lenticular screen. However, this null is not sharp. While a sharp null is not essential to the fully automatic embodiments illustrated in FIGS. 1 and 4, it enhances the operation of the automatic embodiment illustrated in FIG. 7.

Figure 10B:
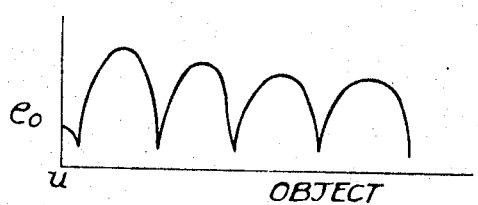
Figure 10C:
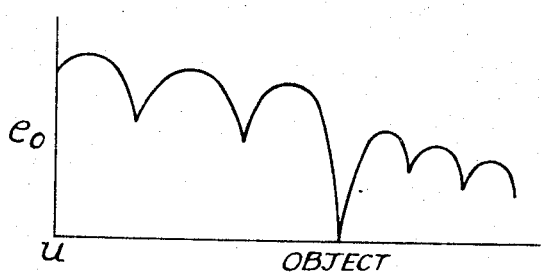

It has also been found that when a lenslet has a focal length much less than $f^2/u$ a signal variation of the type illustrated in FIG. 10B occurs. That is, the ouput signal from the photocell has a plurality of nulls within the focal range of the imaging lens. This is objectionable since these false nulls may stop movement of the imaging lens when its focal point is not located at the lenticular screen. These nulls are much sharper than the null illustrated in FIG. 10A; hence, they make for a more precise null. A screen of the type illustrated in FIG. 8 combines the desirable qualities of both types of lenslets to provide a photocell output of the type illustrated in FIG. 10C. A plurality of secondary nulls occur; however, only one main null occurs. The main null voltage value is much less than the secondary nulls voltage values and it occurs when the image plane of the imaging lens is coincident with the lenticular screen. By using an integrated amplifier the effects of the secondary nulls are further reduced by time-averaging and the main null is used to control the focusing of the imaging lens and its associated main lens. It is a lenticular screen of the type illustrated that is used in the embodiment of the invention illustrated in FIG. 7.

The FIG. 9 embodiment of a lenticular screen gives the same effect as the FIG. 8 embodiment because it comprises a plurality of random-size, random-placed, spherical lenslets. Somes of these lenslets have a focal length greater than $f^2/u$. Hence, the FIG. 9 embodiment of a lenticular screen is also useful in the FIG. 7 embodiment of the invention.

The system illustrated in FIG. 7 is made operative when a button is pushed. This button is coupled to the spring return mechanism 96, the switch 85, and the switch 91. This button is not shown but may be mounted on the case of the camera. Initially, when the button is pushed, the spring return 96 returns the lens to an initial position. This initial position is preferably where the imaging lens is at its inner focal point. Simultaneously, the lenticular screen motor 19 is energized to move the lenticular screen 81. The light passing through the lenticular screen is detected by the photocell. The signal from the photocell is filtered by the filter 87 and applied to integrating amplifier 89. The output from the integrating amplifier 89 is amplified by the power amplifier 93 and drives the unidirectional motor 95. Power is not supplied to the power amplifier 93 until the spring 96 returns the lens to its initial position, at which point a switch (not shown) is closed to connect the power source. Thereafter, the motor 95 drives the lens barrel toward focus against the spring force of spring return 96. The direction of movement of the unidirectional motor 95 is to move the imaging lens toward focus. That is, the imaging lens is moved out from its inner point toward infinity. As it moves toward infinity, it brings its focal point (for a particular object) toward the lenticular screen. When its focal point is coincident with the lenticular screen 81, the object is in focus and movement stops. More specifically, when the focal point of the imaging lens 11 is coincident with the plane of the lenticular screen 81 a null of the type illustrated in FIG. 10C as the object null, occurs. This null turns off the unidirectional motor 95 and stops movement of the lens. Thereafter, the switch may be released and the camera will be in focus for taking a picture. Hence, the system eliminates the necessity of manually focusing a camera. However, each time the switch is pushed, the motor reverts to its initial position and refocuses. Therefore, the system does not maintain focus as described in the FIG. 1 and FIG. 4 embodiments but only provides for the initial focusing of a camera.

The foregoing embodiments of the invention have been described in connection with lenticular screens 13, 55 and 81 as illustrated in FIGS. 2, 3, 5–6 and 8–9, respectively. In FIGS. 2 and 5, the semi-cylindrical lenslets abut each other. FIGS. 3, 6 and 8 illustrate embodiments of the lenticular screens wherein the semi-cylindrical lenslets are separated by flat spaces. FIG. 9 illustrates an embodiment of a lenticular screen wherein the lenslets are spherical. The screens of FIGS. 2 and 3 have been found to operate satisfactorily in the embodiment illustrated in FIG. 1. The screens illustrated in FIGS. 5 and 6 have been found to be satisfactorily operative in the FIG. 4 embodiment. Further, the screens illustrated in FIGS. 8 and 9 have been found to satisfactorily operate in the FIG. 7 embodiment. However, it will be appreciated by those skilled in the art that the lenticular screens illustrated in FIGS. 2 and 3 are operable in the embodiment of the invention illustrated in FIG. 7. Similarly, the lenticular screens illustrated in FIGS. 8 and 9 can be used in the FIG. 1 embodiment. In this connection, it will also be appreciated by those skilled in the art that the semi-cylindrical or spherical refractive lenslets illustrated in the figures have only been illustrated by way of example and other types of lenslets are also suitable for operation in the invention. Generally speaking, any type of regularly refractive design such as lenslets having triangular or trapezoidal cross sections can be accommodated by the design. In addition, the invention has been illustrated with the lenslets of the lenticular screen facing the imaging lens. It should be understood, however, that this is just by way of example and that satisfactory operation is also obtained when the lenslets are facing the photocell. Also, the lenslets can have negative refractive power instead of positive refractive power as illustrated.

While the foregoing description has illustrated embodiments of the invention that are simple in both operation and construction and are not dependent on special or complex components it should be understood that various other structural modifications are within the scope of the invention. For example, the same lens can be used as both the imaging lens and the main lens of an optical system. This is brought about by locating a mirror or prism which may be movable or stationary particularly if semi-reflecting, so as to reflect light from the object onto the lenticular screen. Provision would be made for the removal of the movable reflective medium prior to photographing from the main optical system. An example of this type of general arrangement is a conventional single lens reflex camera. Similarly, it will be apparent to those skilled in the art that the same lens can be used as both the imaging lens and the main lens by providing for removal of the lenticular screen and the structures control portion just prior to the taking of a picture. Consequently, the invention may be practiced otherwise than as specifically disclosed herein.

The embodiments of the invention in which an exclusive property or privilege is claimed are defined as follows:

1. Apparatus for automatically focusing an optical viewing system comprising:
   lens means, having a projection axis, for detecting light from an object to be focused and focusing said light at a point on said projection axis;
   lenticular screen means having a plurality of lenslets, located on at least one surface positioned to intersect the projection axis of said lens means and movable in a plane perpendicular to said projection axis;
   means for moving said lenticular screen means in the plane perpendicular to said projection axis;
   means operatively connected to said lens means for moving said lens means to a predetermined initial position; and
   means responsive to light passing through said lenticular screen means for moving said lens means in a direction from said initial position to bring its focal point to the face of said lenticular screen means when said focal point is not located at said lenticular screen means.

2. Apparatus as claimed in claim 1 wherein said means responsive to light passing through said lenticular screen means includes a light detecting means positioned along the projection axis of said lens means and adapted to intersect the light rays passed by said lens means through said lenticular screen means and means connected to the output from said light detecting means for generating a unidirectional output corresponding to the light rays intersected by said light detecting means.

3. Apparatus as claimed in claim 2 wherein said means connected to the output of said light detecting means includes a filter, an integrating amplifier, and a power amplifier, all connected in series.

4. Apparatus as claimed in claim 3 wherein said means responsive to light passing through said lenticular screen means also includes a unidirectional motor operatively connected to said lens means through a shaft and having its electrical input connected to the output of said power amplifier.

5. Apparatus as claimed in claim 4 wherein said means for moving said lens means to an initial position includes a spring return means.

6. Apparatus as claimed in claim 5 wherein said means for moving said lenticular screen means includes a motor and a power source.

7. Apparatus as claimed in claim 6 including a switch connected between said power source and said motor, a second switch connected between said integrating amplifier and said power amplifier and wherein said switches are connected in operative relationship together and with said spring return means.

8. Apparatus as claimed in claim 7 wherein said lenticular screen comprises a flat, circular, transparent sheet of material having a plurality of radially arrayed lenslets of different sizes located on one flat surface.

9. Apparatus as claimed in claim 8 wherein said lenslets are generally radial in location comprising a first plurality of lenslets of one size, a flat area, and a second plurality of lenslets of a second size, said first size, flat area and second size configuration covering the area of said one flat side.

10. Apparatus as claimed in claim 7 wherein said lenticular screen means comprises a flat, circular, transparent sheet of material having a plurality of randomly oriented spherical lenslets located on one surface thereof.

11. Apparatus as claimed in claim 10 wherein said lenslets are variable in size.

12. Apparatus for automatically focusing an optical viewing system comprising:
   lens means, having a projection axis, for detecting light from an object to be focused and focusing said light at a point on said projection axis;
   lenticular screen means positioned to intersect the projection axis of said lens means and movable in a plane perpendicular to said projection axis;
   commutator means operatively coupled to said lenticular screen means and movable with said lenticular screen means;
   means for moving said lenticular screen means and said commutator means so that said lenticular screen means moves in a plane perpendicular to said projection axis;
   means responsive to light passing through said lenticular screen means for moving said lens means in a direction to bring its focal point to the face of said lenticular screen means when said focal point is not located at said lenticular screen means and including brush means operatively coupled to said commutator means so that said means responsive to light passing through said lenticular screen means is only operative when said commutator means is in certain predetermined positions.

13. Apparatus as claimed in claim 12 wherein said lenticular screen means comprises a flat, circular, transparent material having a plurality of semi-cylindrical lenticulations located on one face thereof, said lenticulations radially separated by a predetermined angle.

14. Apparatus as claimed in claim 13 wherein said commutator means has a plurality of lobes equal in number to said lenticulations, said lobes operatively engaging said brush means when a lenticulation is passing through the projection axis of said lens means.

15. Apparatus as claimed in claim 14 wherein said means responsive to light passing through said lenticular screen means includes:
a photocell mounted along the projection axis of said lens means and on the opposite side of said lenticular screen means;
gating means connected to the output of said photocell and operatively energized by said commutator means and said brush means;
steering circuit means connected to the output of said gating circuit for steering the input to said steering circuit to one of two outputs in accordance with the polarity of said input;
positive trigger monostable circuit means connected to one output of said steering circuit means for generating a positive pulse;
negative trigger monostable circuit means connected to the second output of said steering circuit means for generating a negative pulse;
complementary power amplifier means connected to the outputs of said positive and negative trigger monostable circuit means for amplifying both positive and negative input signals; and
a bidirectional motor operatively connected to said lens means and having its electrical input connected to the output of said complementary power amplifier means.

16. Apparatus as claimed in claim 15 including:
an amplifier and a filter connected in series between said photocell and said gating means; and
a second amplifier connected between said gating means and said steering circuit means.

17. Apparatus as claimed in claim 7 wherein said lenticular screen comprises a flat, circular, transparent sheet of material having a plurality of regularly oriented spherical lenslets located on one surface thereof.

References Cited
UNITED STATES PATENTS

| | | | |
|---|---|---|---|
| 2,922,351 | 1/1960 | Hering | 88—24 |
| 3,041,459 | 6/1962 | Greene | 250—234 |
| 3,149,547 | 9/1964 | Jurenz | 95—44 |
| 3,367,254 | 2/1968 | Townsley | 95—44 |

NORTON ANSHER, *Primary Examiner.*

C. B. FUNK, *Assistant Examiner.*

U.S. Cl. X.R.

352—140